(12) United States Patent
Christie et al.

(10) Patent No.: US 6,529,514 B2
(45) Date of Patent: *Mar. 4, 2003

(54) ATM GATEWAY SYSTEM

(75) Inventors: Joseph Michael Christie, deceased, late of San Bruno, CA (US); by Joseph S. Christie, executor; by Jean M. Christie, executor, both of Mount Pleasant, PA (US); Albert Daniel Duree, Independence, MO (US); Michael Joseph Gardner, Overland Park, KS (US); Tracy Nelson, Shawnee Mission, KS (US); William Lyle Wiley, Olathe, KS (US)

(73) Assignee: Sprint Communications Company L.P., Kansas City, MO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 125 days.

(21) Appl. No.: 09/392,489

(22) Filed: Sep. 9, 1999

(65) Prior Publication Data

US 2001/0053154 A1 Dec. 20, 2001

(Under 37 CFR 1.47)

Related U.S. Application Data

(63) Continuation of application No. 09/123,162, filed on Jul. 27, 1998, now Pat. No. 6,026,091, which is a continuation of application No. 08/594,661, filed on Feb. 2, 1996, now abandoned, which is a continuation-in-part of application No. 08/568,551, filed on Dec. 7, 1995, now Pat. No. 5,825,780, which is a continuation of application No. 08/238,605, filed on May 5, 1994, now abandoned.

(51) Int. Cl.$^7$ ............................................. H04L 12/28
(52) U.S. Cl. ...................... 370/401; 370/410; 370/466; 370/395.1
(58) Field of Search .............................. 370/389, 395.1, 370/396, 397, 398, 399, 400, 409, 410, 422, 426, 465, 466, 395.5, 401, 395.3, 395.31

(56) References Cited

U.S. PATENT DOCUMENTS

| | | | | |
|---|---|---|---|---|
| 5,434,852 A | * | 7/1995 | La Porta et al. | 370/410 |
| 5,483,527 A | * | 1/1996 | Doshi et al. | 370/410 |
| 5,509,010 A | * | 4/1996 | La Porta et al. | 370/410 |
| 5,568,475 A | * | 10/1996 | Doshi et al. | 379/220 |

* cited by examiner

Primary Examiner—Ajit Patel
(74) Attorney, Agent, or Firm—Harley R. Ball; Steven J. Funk; Kevin D. Robb

(57) ABSTRACT

The invention is a system for modifying the VPI/VCIs in ATM cells transferred between two ATM systems on a call-by-call basis. A signaling processor receives signaling for the call and selects a new VPI/VCI for the call. The signaling processor generates a control message that identifies the old and new VPI/VCIs and transfers the control message to an ATM gateway. The ATM gateway modifies the old VPI/VCI in the ATM cells to the new VPI/VCI.

22 Claims, 12 Drawing Sheets

ATM GATEWAY SYSTEM

CROSS-REFERENCES

This application is a continuation of U.S. application Ser. No. 09/123,162 and now U.S. Pat. No. 6,026,091, filed on Jul. 27, 1998, entitled "ATM GATEWAY SYSTEM", which is hereby incorporated by reference into this application, and which is a continuation of abandoned U.S. patent application Ser. No. 08/594,661, filed on Feb. 2, 1996 now abandoned, entitled "ATM GATEWAY SYSTEM," which is hereby incorporated by reference into this application, and which is a continuation-in-part U.S. application Ser. No. 08/568,551 now of U.S. Pat. No. 5,825,780, filed on Dec. 7, 1995, entitled "METHOD, SYSTEM AND APPARATUS FOR TELECOMMUNICATIONS CONTROL", which is a continuation of abandoned U.S. patent application Ser. No. 08/238,605, filed on May 5, 1994 now abandoned, entitled "METHOD, SYSTEM AND APPARATUS FOR TELE-COMMUNICATIONS CONTROL".

BACKGROUND

Current ATM communications systems may transport communications traffic over switched virtual circuits (SVC) or permanent virtual circuits (PVCs). SVCs are set-up and torn down as requested—like telephone calls. PVCs are provisioned through an ATM network and are used like a dedicated communications channel. Aside from PVCs and SVCs, Permanent Virtual Paths (PVPs) and Switched Virtual Paths (SVPs) are also available. The use of SVCs or SVPs typically results in more efficient use of ATM bandwidth. As is known, ATM communications paths are logically designated by the Virtual Path Identifier (VPI) and the Virtual Channel Identifier (VCI) located in the ATM cell header.

ATM cross-connect devices route ATM traffic by associating virtual connections. A cross-connect associates two virtual connections by changing the VPI/VCI of ATM cells from one virtual connection to the VPI/VCI of the other virtual connection. For PVCs or PVPs, these routes have been pre-provisioned. This means that the routing configuration is set and remains static. Typically, a cross-connect has multiple routing configurations that are stored in memory. Network administration can select different routing configurations, but changes are not implemented dynamically on a call-by-call basis. In any event, the number of routing configurations required to support call routing would be prohibitively complex. In a provisioned cross-connect, the VPI/VCIs in incoming cells are changed to pre-assigned VPI/VCIs.

SVCs and SVPs are handled differently. Since the VPI/VCIs are set-up and torn down frequently, provisioned routing configurations with pre-assignments of VPI/VCIs are not possible. For SVCs and SVPs, the VPI/VCIs are dynamically selected in real time on a call-by-call basis by an ATM switching function. The switching function makes the selections by processing of information in telecommunications signaling. An example of such signaling is B-ISUP signaling.

Some ATM systems use pre-provisioned PVPs to connect the network elements, and then dynamically select SVCs within the PVPs. In this way, network elements can each be interconnected by PVPs to form a flat architecture, and SVCs can be dynamically allocated to maximize efficient use of bandwidth. In this environment, problems are caused when one network is connected to another network. Current signaling capability required by the switching function is not able to handle high volumes of traffic. This impairs the ability of separate networks to dynamically allocate SVCs between multiple cross-connects on a call-by-call basis. As for the PVPs, extensive administrative information must be shared to coordinate all of the PVP provisioning between the two networks. An additional coordination problem occurs with signaling between networks. When networks interface at multiple points, signaling routes must be defined so each interface point can signal the opposing interface points.

One solution is to install complex ATM switches with full signaling capability. At present, such devices are not readily available at the quality and cost required for a robust and cost-effective deployment. There is a need for a cost-efficient system to interface between two ATM networks and alleviate the problems described above—namely the coordination of PVPs and SVCs.

Gateways are devices that interface different networks or systems. They allow interconnection between different networks that are not coordinated. Some examples are Internet Protocol (IP) bridges and X.75 gateways. But, these systems are not able to interface PVPs and SVCs of two ATM networks. These devices are not capable to handle ATM. Additionally, they are not designed to handle the dynamic allocation of connections required for SVCs. Thus, an ATM gateway is needed to interface two ATM networks. This ATM gateway must be able to handle the dynamic allocation of VPI/VCI connection assignments required to support SVCs.

SUMMARY

The invention includes a method of operating an ATM gateway system to handle a call where a first ATM system transmits ATM cells and telecommunications signaling for the call to the ATM gateway system. The ATM contain a first Virtual Path Identification/Virtual Channel Identification (VPI/VCI). The method comprises receiving the signaling for the call into a signaling processor, and processing the signaling to select a second VPI/VCI for the call. The method further comprises generating a control message in the signaling processor that identifies the first VPI/VCI and the second VPI/VCI, and transmitting the control message to an ATM gateway. The method further comprises receiving the ATM cells from the first ATM system into the ATM gateway, modifying the first VPI/VCI to the second VPI/VCI in response to the control message, and transmitting the modified ATM cells from the ATM gateway to a second ATM system.

The invention also includes an ATM gateway and an ATM gateway system. The ATM gateway receives ATM cells from the first ATM system, modifies the first VPI/VCI to the second VPI/VCI in response to the control message, and transmits the modified ATM cells to the second ATM system. The gateway system includes the gateway and also includes a signaling processor that receives and processes the signaling for the call to select a second VPI/VCI for the call. The signaling processor also generates and transmits a control message that identifies the first VPI/VCI and the second VPI/VCI to the ATM gateway.

In some embodiments, the second ATM system could be provisioned to provide a plurality of VPI/VCI routes, so that the real time selection of the second VPI/VCI provides a Switched Virtual Circuit (SVC) through the provisioned ATM system. This SVC can be provided without an ATM switch.

DETAILED DESCRIPTION

For purposes of clarity, the term "connection" will be used to refer to the transmission media used to carry user traffic. The term "link" will be used to refer to the transmission media used to carry signaling. On the Figures, connections are shown by a single line and signaling links are shown by double lines.

Figure 1:
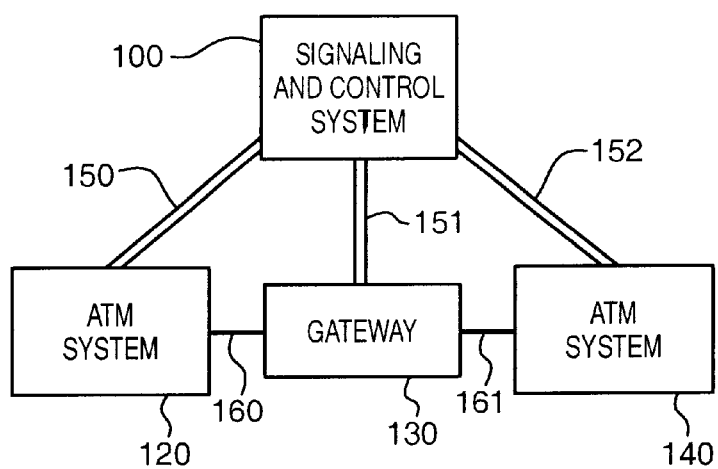
FIG. 1 is a block diagram of a version of the present invention.

FIG. 1 depicts a version of the present invention. Shown are signaling and control system 100, ATM system 120, ATM system 140, and gateway 130. These components are connected by connections 160–161 and linked by links 150–152 as shown. Those skilled in the art are aware that large networks have many more components than are shown, but the number of these components has been restricted for clarity. The invention is fully applicable to large networks.

ATM systems 120 and 140 are known in the art. They typically include ATM connections, cross-connects, and switches. Any source of ATM cells is contemplated by the invention. At least one of the ATM systems will have the need to control the VPI/VCIs of cells entering the network. This is because the cells entering the network have VPI/VCIs designated by the preceding network. These VPI/VCIs are not necessarily compatible with the routing configuration of the subsequent network accepting the cells. As such, the VPI/VCIs must be modified to be compatible the new VPI/VCI routing configuration. This is especially true if the ATM network is handling SVCs without an ATM switch to process signaling and select the proper SVCs in real time. If only pre-provisioned cross-connects are used, the VPI/VCI in the incoming cell effectively selects the VPI/VCI the cell will have when it exits the cross-connect. If SVCs are to be dynamically allocated on a per call basis through pre-provisioned cross-connects, a system is needed to modify the VPI/VCIs to allocate SVCs before the cells enter the cross-connect.

Gateway 130 provides this capability. Gateway 130 receives ATM cells entering a network and converts the VPI/VCIs in the cells so they are compatible with network routing configuration. Gateway 130 would modify the VPI/VCIs of cells entering ATM system 140 on a call-by-call basis. This allows for the allocation SVCs. Gateway 130 could also operate in a two-way fashion. This means it will modify the VPI/VCIs of cells entering ATM system 120 according to ATM system 120 requirements, and it will modify the VPI/VCIs of cells entering ATM system 140 according to ATM system 140 requirements. Gateway 130 is capable of modifying VPI/VCIs based on control instructions from signaling and control system 100.

Signaling and control system 100 receives signaling passed between the two networks. Typically, the signaling would be Signaling System #7 (SS7) messages. As will be described in detail later, signaling and control system 100 is able to receive and process SS7 signaling to select the appropriate VPI/VCI for cells entering a given network. It passes this information to the gateway 130 over control link 151. Control link 151 could be a bus, a data link or a signaling link. Those skilled in the art will appreciate various ways to couple signaling and control system 100 with gateway 130. It is important to note that signaling and control system 100 and gateway 130 do not comprise an ATM switch. Those skilled in the art will appreciate from the following discussion how these components can be constructed and operated without the complexities and cost of an ATM switch. Another advantage is that the gateway has single input/output throughput. This avoids many problems ATM switches encounter with multiple input and output ports. This also allows the gateway to concentrate traffic flowing into a network. In other words, the gateway is able to reorganize the traffic entering a network.

Figure 2:
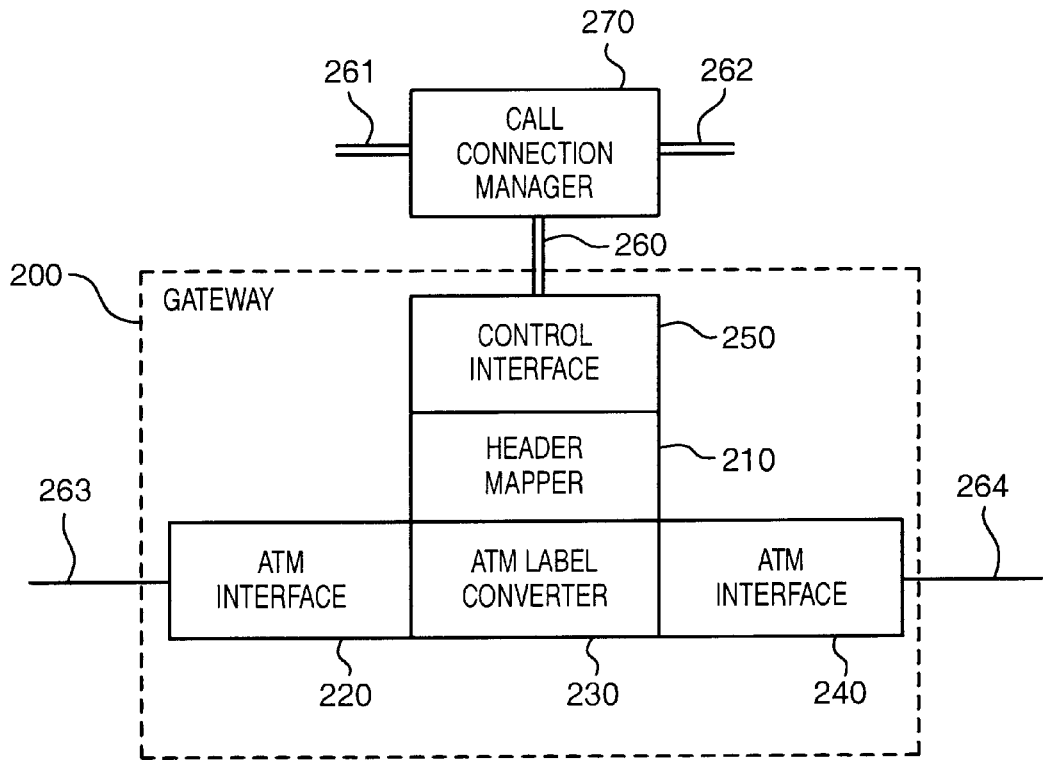
FIG. 2 is a block diagram of a version of the present invention.

FIG. 2 depicts a version of the present invention. Shown are gateway 200 composed of control interface 250, header mapper 210, ATM label converter 230 and ATM interfaces 220 and 240. Connections 263 and 264 are ATM connections to ATM systems. Call/Connection Manager (CCM) 270 is a version of signaling and control 100 from FIG. 1. CCM 270 processes signaling and exerts control over the gateway 200 via link 260. This link could be any means of exchanging control information such as a signaling link, a data link, or a bus arrangement. Links 261 and 262 provide signaling to CCM 270. An example would be an SS7 link, but other means to transfer signaling would be appreciated by one skilled in the art.

CCM 270 is a processing system that receives and processes signaling messages. CCM 270 processes the signaling messages to select VPI/VCI assignments for gateway 200. In other words, it is a call processor. It is different from a switch in that it does not have a switching fabric, and it does not carry actual user traffic. Typically, the processing is based on a dialed number, and can include validation, routing, and billing. CCM 270 would be functional to send control messages to the gateway 200. For call set up, the control message would instruct gateway 200 to modify the VPI/VCI in incoming cells to the VPI/VCI selected dynamically by CCM 270. For call tear down, the control message would instruct gateway 200 to disassociate the incoming VPI/VCI from the outgoing VPI/VCI. This releases the bandwidth associated with the call. CCM 270 is discussed in detail below.

Control interface 250 is functional to receive control messages and transmit status information. It could be a conventional hardware/software interface. Header mapper 210 is a logical table that contains the information associating incoming VPI/VCIs with outgoing VPI/VCIs. This table is dynamic and is updated on a call by call basis. ATM label converter 230 is functional to change the VPI/VCIs in incoming ATM cells to new VPI/VCIs based on the table in header mapper 210.

ATM interface 220 is functional to accept incoming cells from connection 263 and then send the cells through label converter 230. ATM interface 240 is functional to accept converted cells from ATM label converter 230 and transmit these cells on connection 264. These ATM interfaces are also able to perform reciprocal processing for ATM traffic flowing in the reverse direction.

Telecommunications signaling is used to set-up and tear down connections for a call. Setting-up a connection would entail creating a series of logically connected VPI/VCI communications paths from end to end. The following operation of the invention is described in terms of SS7, but those skilled in the art are aware of other signaling systems that could also be used with the invention. Some examples of these other signaling systems would be C7 and UNI.

Typically, the network providing cells to gateway 200 does not have knowledge of the actual destination for these cells beyond gateway 200. This "first" network will also produce an Initial Address Message (IAM) associated with the call. The IAM contains information that can be used to route the cells for the call. The IAM is transferred to CCM 270. CCM 270 will process the IAM according to the requirements of the "second" network receiving cells from gateway 200. CCM 270 will select a new VPI/VCI based on the IAM.

In one embodiment, the system would operate as follows for a call incoming over connection 263. Typically, the network providing the call to gateway 200 will seize an available connection (VPI/VCI) to gateway 200. This connection is represented by connection 263. CCM 270 will receive the IAM produced in association with the call over link 261. The routing label in the IAM contains a Circuit Identification Code (CIC). The CIC identifies the VPI/VCI in the incoming cells for the call. In other words, the CIC in the IAM identifies the seized connection (in connection 263) to gateway 200. CCM 270 will select the VPI/VCI for routing the call over connection 264. CCM 270 then sends a control message to control interface 250 through link 260. The control message will instruct gateway 200 to modify the VPI/VCI of the incoming cells so they contain the VPI/VCI selected by CCM 270. Control interface 250 responds with an acknowledgment over link 260 to CCM 270. In the case of error conditions, the acknowledgment will be negative acknowledgment. Header mapper 210 will receive the instruction information from control interface 250 and will store this information for the duration of the call. CCM 270 would also generate another IAM for transfer over link 262 to the next node requiring a call message.

Cells for the call will arrive at ATM label converter 230 from ATM interface 220 and connection 263. ATM label converter 230 will use the VPI/VCI of the incoming cells as the key to enter header mapper table 210 to yield the new VPI/VCI. ATM label converter 230 will modify the VPI/VCI in the cell headers to the new VPI/VCI. The cells are then forwarded to ATM interface 240 for transmission over connection 264.

At the end of the call, a release message (REL) is received by CCM 270 over link 261. The REL will cause CCM 270 to begin call tear down procedures. CCM 270 will send a control message to control interface 250 over link 260. Control interface 250 will send the information to header mapper 210 disassociating the incoming and outgoing VPI/VCI for the call. This will cause gateway 200 to terminate the call connection. CCM 270 will then send an appropriate REL over link 262 to the next node. Those skilled in the art will appreciate that other procedures can also be used at the end of the call. For example, the CCM may allow the VPI/VCI assignment to remain for a specified duration.

Preferably, connection 264 would transfer these modified cells to an ATM cross-connect system that has pre-provisioned VPI/VCIs to potential network destinations. Because the VPI/VCI is selected in real time by CCM 270 based on the signaling and the routing configuration, gateway 200 is able to implement SVCs on a call by call basis. In can be appreciated that by using the requirements for the network accepting the cells, CCM 270 and gateway 200 can implement SVCs for calls proceeding in both directions. It is also important to note that this can be done without the need for a complex ATM switch with signaling and call processing capability.

Figure 3:
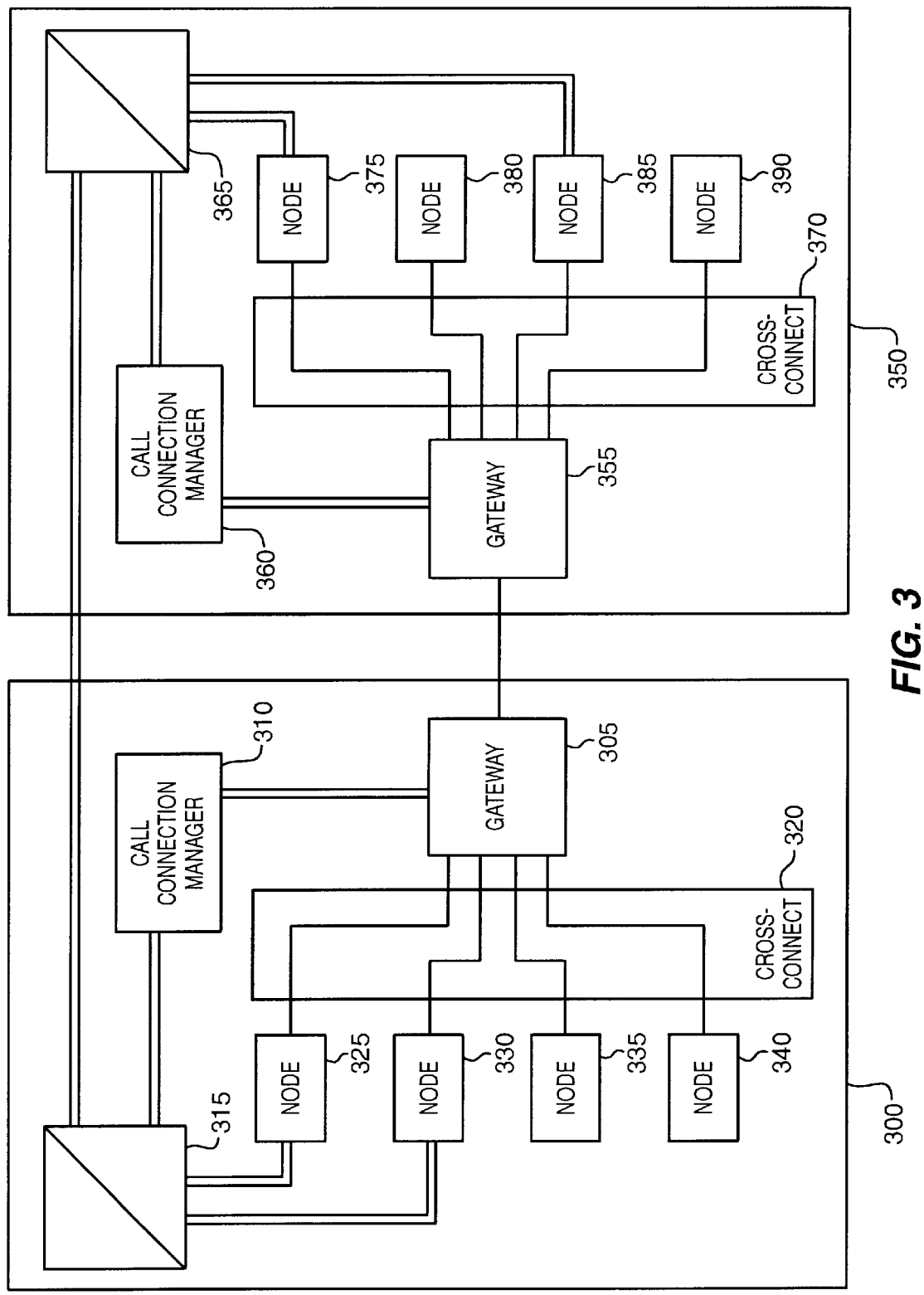
FIG. 3 is a block diagram of a version of the present invention.

FIG. 3 shows another version of the invention. In this version, SS7 signaling is used, but other signaling could be used in other versions. Shown are ATM system 300 and ATM system 350. ATM system 300 is comprised of gateway 305, call/connection manager (CCM) 310, Signal Transfer Point (STP) 315, ATM cross-connect 320, and nodes 325, 330, 335, and 340. ATM system 350 is comprised of gateway 355, CCM 360, STP 365, ATM cross-connect 370, and nodes 375, 380, 385, and 390.

For the sake of clarity, the connections and links are not numbered. Virtual paths are shown (single lines) provisioned through ATM cross-connect 320 between gateway 305 and nodes 325, 330, 335, and 340. Virtual paths are shown provisioned through ATM cross-connect 370 between gateway 355 and nodes 375, 380, 385, and 390. Gateway 305 and gateway 355 are connected by a virtual path as well. Signaling links are shown interconnecting the various components (as discussed above, the link between the CCM and the gateway could also be a conventional datalink or bus arrangement). Note that cross-connects 320 and 370 do not require signaling. They are provisioned and do not need signaling/switching capability on a call-by-call basis.

Gateway 305 and 355 have been described above. They modify the VPI/VCIs in ATM cells as instructed by control messages from the CCMs. CCM 310 and 360 are decribed above and in detail below. They process signaling and select VPI/VCIs on a call by call basis. The selections are provided to the gateways. STPs 315 and 365 are known in the art. They route signaling messages. ATM cross-connects 320 and 370 are known in the art. They route ATM cells based on a pre-provisioned routing configuration and the VPI/VCI in the cells. Nodes 325, 330, 335, 340, 375, 380, 385, and 390 are ATM devices. Any device that transmits or recieves ATM cells is contemplated by the invention. Some examples are ATM switches, ATM cross-connects, and ATM Customer Premesis Equipment (CPE). Some of these nodes may use signaling and some may not need signaling.

In operation, this version of the invention works as follows for a call from node 325 to node 385. Node 325 would recognize that the call did not terminate within network 300 and would sieze a connection to gateway 355. This connection would be provisioned through cross-connect 320 and represented by the VPI/VCI in the cell headers. Gateway 305 is inactive on this call and could even be omitted. It is shown to illustrate the Gateway function could be implemented for calls passing in the other direction. Node 325 would also transfer an IAM to CCM 360 identifying the siezed VPI/VCI. The IAM would be routed by STP 315 and STP 365 to CCM 360. It is important to note that ATM system 300 does not know the routing configuration of ATM system 350.

CCM 360 will process the IAM from Node 325 to select a VPI/VCI to node 385. Gateway 355 has a provisioned virtual path to node 385 through cross-connect 370. CCM 355 would select an available VCI within that VPI. CCM 355 would identify both the VPI/VCI from gateway 305 and the VPI/VCI to node 385 in a control message to gateway 355. Gateway 355 would modify the old VPI/VCI to the new VPI/VCI selected by CCM 355 and transfer the modified cells to cross-connect 370. Based on its pre-provisioned routing configuration and the VPI/VCI selected by CCM 355, cross-connect 370 would transfer these cells to node 385. If necessary, CCM 355 would transfer an IAM node 385 through ST 365.

It should be appreciated that the above procedure could be repeated for multiple calls between different nodes. This includes calls from network 350 to network 300. The CCM, the gateway, and the cross-connect work together to provide SVCs on a call-by-call basis. This accomplished without the cost or complexities of an ATM switch.

The Call/Connection Manager (CCM)

Figure 4:
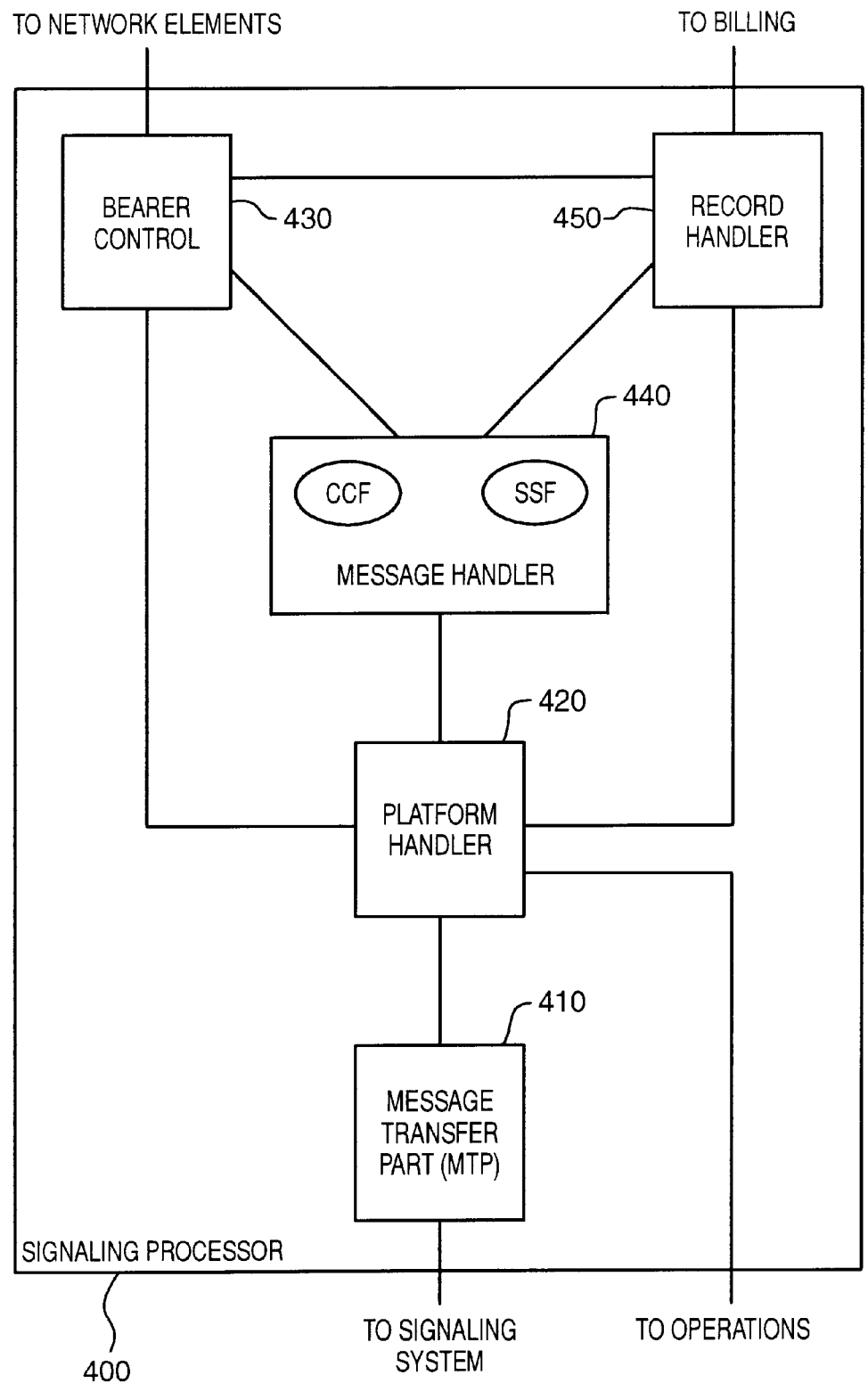
FIG. 4 is a logic diagram of a version of the invention.

FIGS. 4–13 refer to a preferred embodiment of the signaling processor, also known as the CCM, but any processor which supports the requirements stated for the invention would suffice. FIG. 4 depicts a signaling processor suitable for the invention. Signaling processor 400 would typically be separate from the gateway, but those skilled in the art appreciate that they could be housed together and coupled in a bus arrangement instead of being coupled by a data or signaling link. Signaling processor 400 may support a single gateway or support multiple gateways.

Signaling processor 400 includes Message Transfer Part (MTP) 410. MTP 410 can be comprised of signaling point software that is known in the art. MTP 410 includes various levels known as MTP 1, MTP 2, and MTP 3. MTP 1 defines the physical and electrical requirements for a signaling link. MTP 2 sits on top of MTP 1 and maintains reliable transport over a signaling link by monitoring status and performing error checks. Together, MTP 1–2 provide reliable transport over an individual link. A device would need MTP 1–2 functionality for each link it uses. MTP 3 sits on top of MTP 2 and provides a routing and management function for the signaling system at large. MTP 3 directs messages to the proper signaling link (actually to the MTP 2 for that link). MTP 3 directs messages to applications using MTP 410 for access to the signaling system. MTP 3 also has a management function which monitors the status of the signaling system and can take appropriate measures to restore service through the system. MTP levels 1–3 correspond to layers 1–3 of the open systems interconnection basic reference model (OSIBRF). MTP 410 could also include Signaling Connection Control Part (SCCP) functions, as well as, TCAP, and ISUP functional interfaces. In addition, MTP 410 may be equipped with ISUP timers that generate release messages or re-transmit messages where appropriate. If B-ISUP signaling is being used, MTP 410 could also be equipped with B-ISUP capability. All of these elements are known in the art.

Also shown for signaling processor 400 are platform handler 420, bearer control 430, message handler 440, and record handler 450. MTP 410 could be connected to platform handler 420 by an ethernet interface supporting TCP/IP which transfers signaling messages from MTP 410 to platform handler 420. Those skilled in the art will recognize other interfaces and protocols which could support these functions in accord with the invention.

Platform handler 420 is a system which accepts ISUP messages from MTP 410 and routes them to message handler 440. Message handler 440 is a system which exchanges signaling with platform handler 420 and controls the connection and switching requirements for the calls. Bearer control 430 handles bearer capabilities for the call. Record Handler 450 generates call records for back-office systems.

In operation, ISUP messages are routed by MTP 410 to platform handler 420. Platform handler 420 would route the ISUP messages to message handler 440. Message handler 440 would process the ISUP information. This might include validation, screening, and retrieving additional data for call processing. Bearer control 430 would implement the bearer capabilities required, such as digital signal processing (DSP), through control messages to the appropriate network elements. Message handler 440 would complete call processing. Message handler 440 would generate the appropriate messages to implement the call and pass the messages to platform handler 420 for subsequent transmission to the designated network elements. Message handler 440 would also receive ISUP messages from MTP 410 at the completion of the call. Message handler 440 would process these messages and generate subsequent messages to tear down the call. Record handler 450 would obtain call information from message handler 440 and use this information to generate call records. The call records could be used for billing purposes.

Functional entities are well known in the art. Message handler 440 includes at least the call control function (CCF) and the service switching function (SSF). The CCF establishes and releases call connections, and the SSF recognizes triggers during call processing by the CCF and provides an interface between the CCF and the service control function (SCF). The SCF identifies services and obtains data for the service, and is preferably housed in a remote database, such as an SCP. (As such, the SCF is not shown on FIG. 4.) Message handler 440 is able to control connections, recognize triggers, and access the SCF in a remote database.

Signaling processor 400 is comprised of hardware and software. Those skilled in the art are aware of various hardware components which can support the requirements of the invention. One example of a such hardware is the FT-Sparc provided by Integrated Micro Products PLC. The FT-sparc could use the Solaris operating system also provided by Integrated Micro Products PLC. MTP 410 could be constructed using commercially available SS7 software interface tools. An example of such tools would be SS7 interface software provided by either Trillium, Inc or by Dale, Gesek, McWilliams, and Sheridan, Inc. Any data storage requirements could be met with conventional database software systems.

Software for platform handler 420, bearer control 430, message handler 440, and record handler 450 could be produced in the following manner. The Intelligent Network Conceptual Model (INCM) of the ITU-T Q.1200 series could be mapped to Specification Design Language (SDL) of ITU-T Z.200 and Message Sequence Charts (MSC) of ITU-T Z.120. Various detection points and points-in-call in the INCM can be skipped to optimize call processing. The SDL could then be compiled into C or C++ and loaded onto the FT-sparc. The software is primarily comprised of several static processes, instantiated processes (from static processes), and communication channels between the processes. Preferably, the software processes would be partitioned into several operating system tasks. Further requirements for the software design will become apparent in the following discussion.

The Platform Handler

Platform handler 420 is preferred, but is not required as its functions could be handled by MTP 410 and/or message handler 440. Platform handler 420 has messaging interfaces that exchange, buffer, dis-assemble, and re-assemble messages for MTP 410, bearer control 430, message handler 440, and record handler 450. Platform handler 420 could exchange these messages over an ethernet—TCP/IP interface, but any technique for transfer of messages is contemplated by the invention. Platform handler 420 could also check the messages for basic flaws. Should more than one message handler be connected to platform handler 420, ISUP messages could be allocated to the message handlers based on the SLS of the particular ISUP message. Platform handler 420 also accepts routing instructions from message handler 440 for routing certain ISUP messages to particular select call model processes of message handler 440.

Platform handler 420 is also responsible for managing and monitoring CCM activities. Among these are CCM start-up and shut-down, log-in and log-off of various CCM modules, handling administrative messages (i.e. error, warning, status, etc.) from the CCM modules, and handling messages from network operations such as queries, configuration instructions, and data updates. The connections to the various CCM modules are shown. The connection to network operations is the man machine interface which allows the CCM to be controlled and monitored by either a remote or a local operator. Platform handler 420 has a process which retrieves configuration data from internal tables to initialize and configure the CCM. The CCM modules also have internal tables which are used in conjunction with this procedure.

The Message Handler

Figure 5:
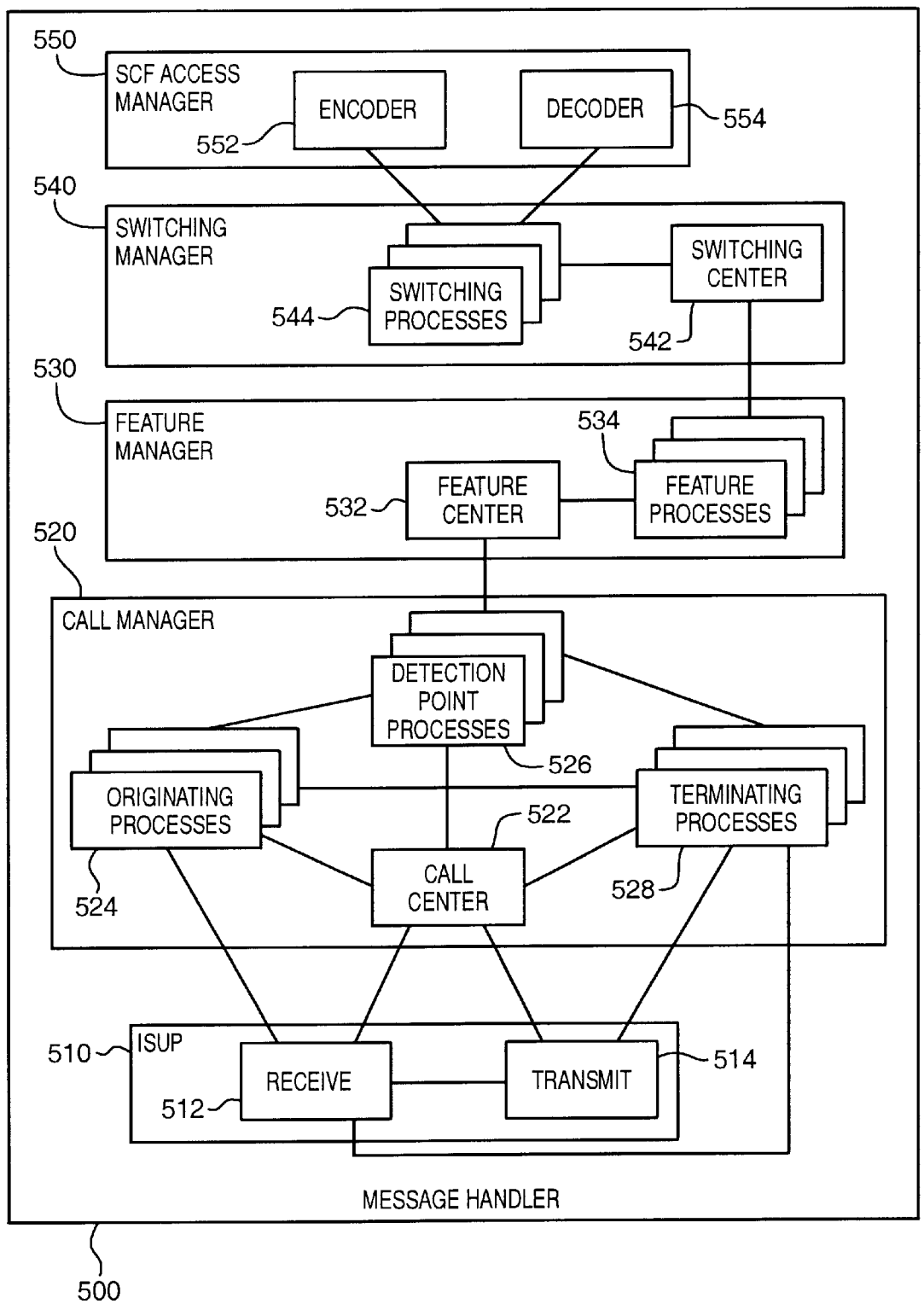
FIG. 5 is a logic diagram of a version of the invention.

FIG. 5 depicts a version of the message handler. External connections have been omitted for the sake of clarity. Message handler 500 is shown and includes ISUP 510, call manager 520, feature manager 530, switching manager 540, and SCF access manager 550. The primary function of message handler 500 is to process ISUP messages for calls, generate subsequent messages, and invoke services. As a result of its processing, message handler 500 is able to assign incoming access connections (CICs in SS7) to VPI/VCIs and instruct the gateway to provide SVPs and SVCs through an ATM cross-connect system.

ISUP 510 receives generic ISUP messages from the platform handler and converts them into specially formatted ISUP messages using receive 512. ISUP 510 reverses this process in transmit 514 for messages sent to the platform handler. Receive 512 forwards formatted messages to call manager 520. ISUP 510 also exchanges local management message with the platform handler.

Call manager 520 could include the functionality specified in the Intelligent Network Call Model (INCM) of ITU-T Q.1214 which encompasses the main functionality of the CCF. Call center 522 receives IAM messages and creates an originating call model process for each IAM. Each originating process is parameterized with data from its particular IAM. Additional origination processes can be created based on the IAM if it is a multi-party call. All of these originating processes are represented by originating processes 524.

An originating process will typically create a detection point process. All of the detection point processes created are represented by detection point processes 526. Each originating process will also set-up a call control block containing data for the call. Each origination process will execute through a point-in call to a detection point. When detection points are encountered, and the originating process has not been programmed to skip them, a signal representing the detection point is forwarded to the corresponding detection point process. As stated above, call processing can be streamlined by skipping selected detection points and points-in-call. When an originating process sends a detection point signal to the corresponding detection point process, processing is suspended at the originating process until a response is received from the detection point process.

Detection point processes 526 provides a portion of the SSF and acts as a buffer between the call processes and feature manager 530. A detection point process analyzes the detection point signal from the origination process to determine if is should be acted on or if it can be ignored. If the processing results in a service request or notification, a corresponding signal is sent to feature manager 530. Detection point responses from feature manager 530 are forwarded back to the appropriate call process. Once call set-up has been authorized for the originating process, a detection point process will also send a signal to call center 522 to create a terminating process.

These terminating processes are represented by terminating processes 528. A terminating process creates and interacts with detection point processes 526 much like an originating process. A terminating process also creates a terminating call control block. ISUP information is transferred from the originating process for a call to the terminating process for the call. The platform handler is instructed of the originating and terminating processes so that subsequent ISUP messages related to that call can be transferred directly to the appropriate processes by the platform handler. Both originating and terminating processes have a local database. For example, a termination process might access local data to translate the NPA-NXX of a dialed number into the VPI to a destination gateway.

The originating processes and terminating processes also exchange messages with bearer control. Typically, these messages relate to DSP and gateway control. For calls that pass through two gateways (an originating gateway into the ATM network and a terminating gateway out of the ATM network), both an origination and termination process is required for each gateway—a total of four call processes. The termination process for the origination gateway will handle mapping the incoming VPI/VCI to the VPI/VCI through the ATM network. The termination process for the terminating gateway will map the VPI/VCI through the ATM network to an outgoing VPI/VCI. If only one gateway is used on the call (in and out of the network at the same gateway), only a single origination process and a single termination process is required.

The originating processes and terminating processes also exchange messages with the record handler. Typically, these messages relate to billing and operational measurements. Upon call tear down, the record handler receives the originating and terminating call control blocks for billing purposes. These call control blocks typically would identify the following: the call control block ID, the originating/terminating process ID, the message handler, the originating LEC, the LEC trunk circuit (CIC), the ATM virtual circuit, the ATM virtual path, the caller's number, the dialed number, the translated dialed number, the originating line information, the ANI service class, the selected route, the number of the selected route, the SLS, the OPC, the DPC, the service indicator (SIO), reason of release, call status, and pointers to adjacent call control blocks. In addition, the call control block would also contain the various times that signaling messages are received, such the address complete message (ACM), the answer message (ANM), the suspend message (SUS), the resume message (RES), and the release message (REL). Those skilled in the art would be aware of other pertinent data to include.

Call manager 520 communicates with feature manager 530. Feature manager 530 handles interaction of services for the call. Examples of services would be 800 calls, PCS calls, and VPN calls, but there are many others. Feature manager 530 is comprised of feature center 532 and feature processes 534. Feature center 532 receives the detection point messages from the detection point processes 526. Feature center 532 then creates a feature process for each call. These processes are represented by feature processes 534. The feature process will determine if additional data is needed for the detection point. If so, a signal is sent to switching manager 540. Responses from switching manager 540 are sent to the appropriate detection point process by the feature process for the call.

In this embodiment, the feature process sends all such service signals to switching manager 540. In other embodiments, services may be segregated into "IN" and "non-IN" services, the feature process would then have to select between an "IN" switching manager or a "non-IN" switching manager when sending service signals to switching manager 540.

Switching manager 540 is comprised of switching center 542 and switching processes 544. Switching manager creates a switching process for each service required on the call. These switching processes are represented by switching processes 544. A switching process will communicate directly with the associated feature process for the call. The switching process will also interface with the SCF. As stated above, the SCF provides the service processing for the call and is preferably located at a remote database. A typical example of accessing SCF would be to send a TCAP query to a service Control Point (SCP) for an "800" number translation. In order to access the SCF, the switching process will use SCF access manager 550. SCF access manager 550 is comprised of encoder 552 and decoder 554. Encoder 552 converts signals from switching processes 544 into the proper format for SCF access. Decoder 554 converts messages from the SCF back into the format for switching processes 544. SCF access manager 550 would typically access the SCF over standard communications links. One example would be an SS7 link using the TCAP/INAP/ASN.1 protocol specified by the ITU. If SS7 is used, SCF access manager 550 could forward its TCAP messages to the MTP function (MTP 410 of FIG. 4) for subsequent transfer to an STP and SCP.

From the above discussion, it should be clear that message handler 500 is comprised of static processes identified as "centers" that create specific processes for each call. Once created, these specific call processes communicate directly with one another to accomplish call processing.

Bearer Control and the Record Handler

As stated bearer control will handle DSP requirements and gateway control. An example of DSP requirement would be to adjust the decibel level. An example of a gateway control would be a VPI/VCI assignment. After a release message on a call, the originating and terminating processes will forward the information in the call control block to record handler 450. Record handler 450 will use the call control block to create a billing record. The call control block would contain information from the ISUP messages for the call and from CCM processing. From the address complete message (ACM), the call control block would include the routing label, CIC, message type, and cause indicators. From the answer message (ANM), the call control block would include the routing label, CIC, message type, and backward call indicators. From the initial address message (IAM), the call control block would include the routing label, CIC, message type, forward call indicators, user service information, called party number, calling party number, carrier identification, carrier selection information, charge number, generic address, origination line information, original called number, and redirecting number. From the release message (REL), the call control block would include the routing label, CIC, message type, and cause indicators. From the suspend message (SUS) or the pass along message (PAM), the call control block would include the routing label, CIC, and message type. Those skilled in the art are familiar with other pertinent information for a billing record and appreciate that some of this information could be deleted. The billing record will be forwarded by record handler 450 to a billing system over a billing interface. An example of such an interface is an ethernet—FTAM protocol.

Call Processing

SS7 messaging is well known in the art. SS7 ISUP messages contain numerous fields of information. Each message will have a routing label containing a destination point code (DPC), an origination point code (OPC), and a signaling link selection (SLS) which are used primarily for routing the message. Each message contains a circuit identification code (CIC) which identifies the circuit to which the message relates. Each message contains the message type which is used to recognize the message. ISUP messages also contain mandatory parts filled with fixed length data and variable length data, in addition to a part available for optional data. These parts vary from message type to message type depending on the information needed.

The initial address message (IAM) initiates the call and contains call set-up information, such as the dialed number. IAMs are transferred in the calling direction to set up the call. During this process, TCAP messages may be sent to access remote data and processing. When the IAMs have reached the final network element, an address complete message (ACM) is sent in the backward direction to indicate that the required information is available and the called party can be alerted. If the called party answers, an answer message (ANM) is sent in the backward direction indicating that the call/connection will be used. If the calling party hangs up, a release message (REL) is sent to indicate the connection is not being used and can be torn down. If the called party hangs up, a suspend message (SUS) is sent and if the called party reconnects, a resume (RES) message keeps the line open, but if their is no re-connection, a release message (REL) is sent. When the connections are free, release complete messages (RLC) are sent to indicate that the connection can be re-used for another call. Those skilled in the art are aware of other ISUP messages, however, these are the primary ones to be considered.

In the preferred embodiment, call processing deviates from the basic call model recommended by the ITU, although strict adherence to the model could be achieved in other embodiments. FIGS. 6—13 depict message sequence charts for the call processing in one embodiment. Message sequence charts are known in the art, and are a recognized format to depict call processing. At the top of the chart, the basic elements of the CCM are shown—the platform handler, the message handler, the bearer control, and the record handler. The blocks below the message handler indicate the processes for the message handler. Further specification at the process level for the platform handler, the bearer control, and the record handler is not required for this discussion. The charts are read down in a chronological sequence. Blocks indicate tasks performed by the process named above. Arrows indicate messages exchanged between the processes or the creation of a new process by an existing process.

Figure 6:
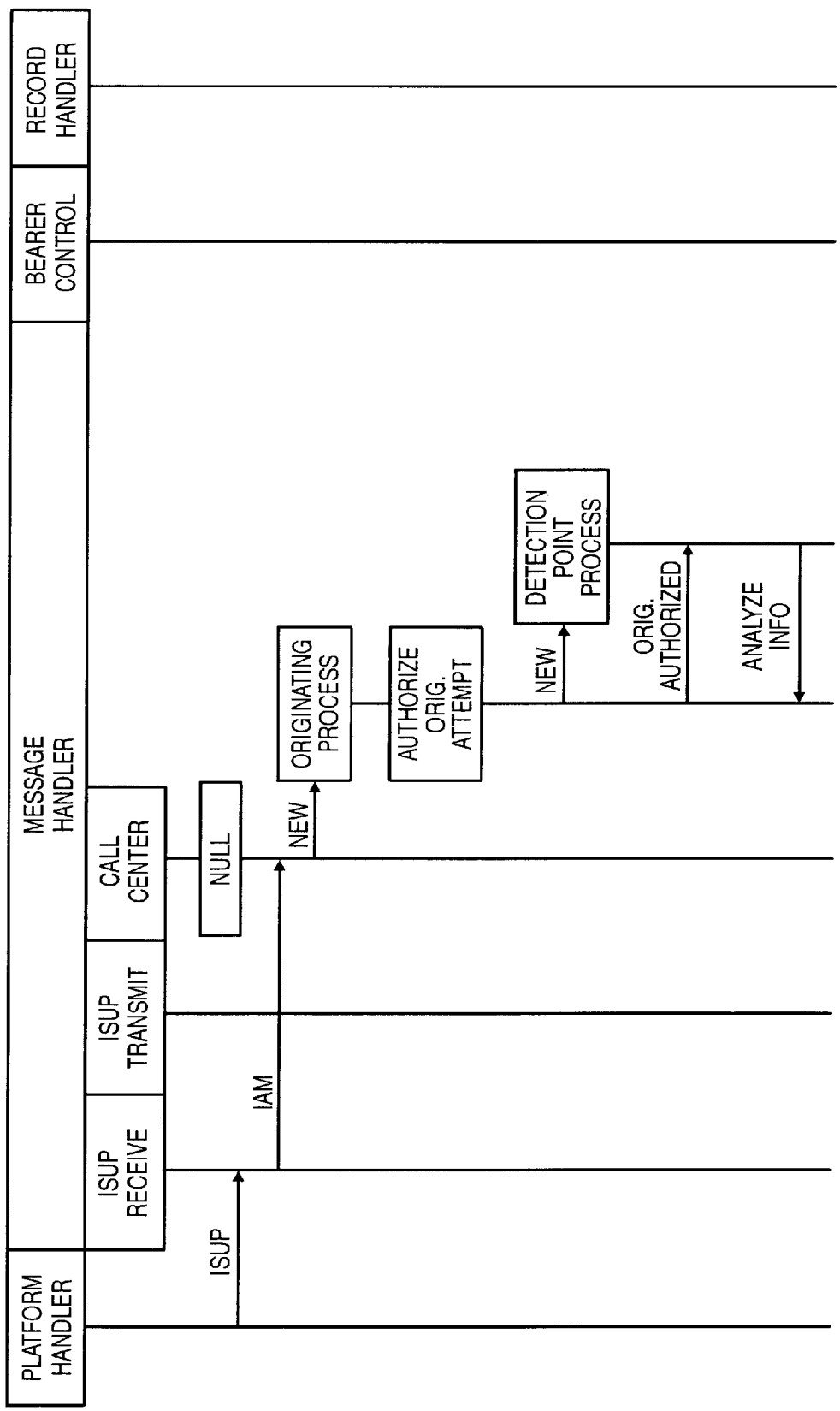
FIG. 6 is a message sequence chart for a version of the invention.
Figure 7:
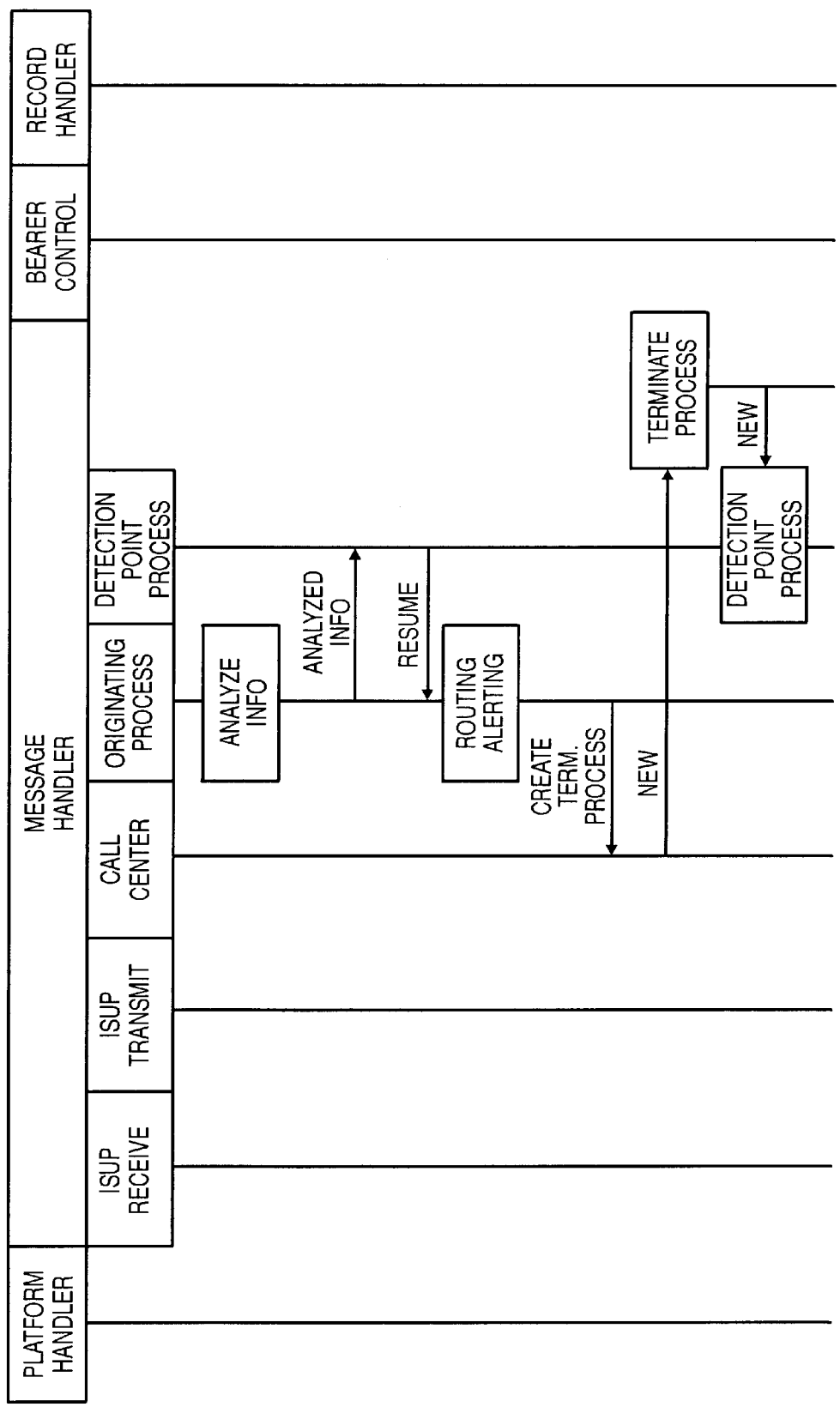
FIG. 7 is a message sequence chart for a version of the invention.

The sequence starts on FIG. 6 with an ISUP message at the platform handler. The platform handler forwards the message to the ISUP receive process of the message handler. If the ISUP message is an IAM, the ISUP receive process forwards the IAM to the call center. The call center had been in the "origination null" point-in-call, but the IAM causes the call center to create an originating call process parameterized with contents of the IAM. The originating process then executes through the "authorize origination attempt" point-in-call. This typically entails ANI validation in a look-up table, but prior to the look-up, call information is checked to determine if ANI validation is required. For particular types of calls, i.e. "800" calls, origination is authorized without ANI validation.

Once origination has been authorized, the originating process creates a detection point process and transmits a signal to the detection point process that origination has been authorized. The detection point process returns a message instructing the origination process to execute through the "analyze information" point-in-call, although a detection point could be programmed at this point if desired. Continuing on to FIG. 7, "Analyze information" typically entails verifying that the dialed number is legitimate and checking call information for any applicable services. A few examples of a services are "800" and PCS. In this example, no services are required for the call—the call is a typical POTS call. Once the analysis has been accomplished, the originating process sends a "analyzed information" message to the detection point process. Typically, the detection point process returns a "resume" message to the originating process, but detection points could be programmed here if desired.

The resume message causes the origination process to execute through the "routing and alerting" point-in-call. This typically entails translating the dialed number to select a destination address. For example, the NPA-NXX of the dialed number could be used in a look-up table to yield the address of the terminating gateway and the device that should receive the call from the gateway. The origination process will also send a message to the call center to create an terminating call process. The terminating call process is provided with the identity of the originating process. The terminating process also creates a detection point process to handle the detection points it encounters. For purposes of clarity, this is indicated along the same line as the originating process detection point, although it should be understood that each process communicates with its corresponding detection point.

Figure 8:
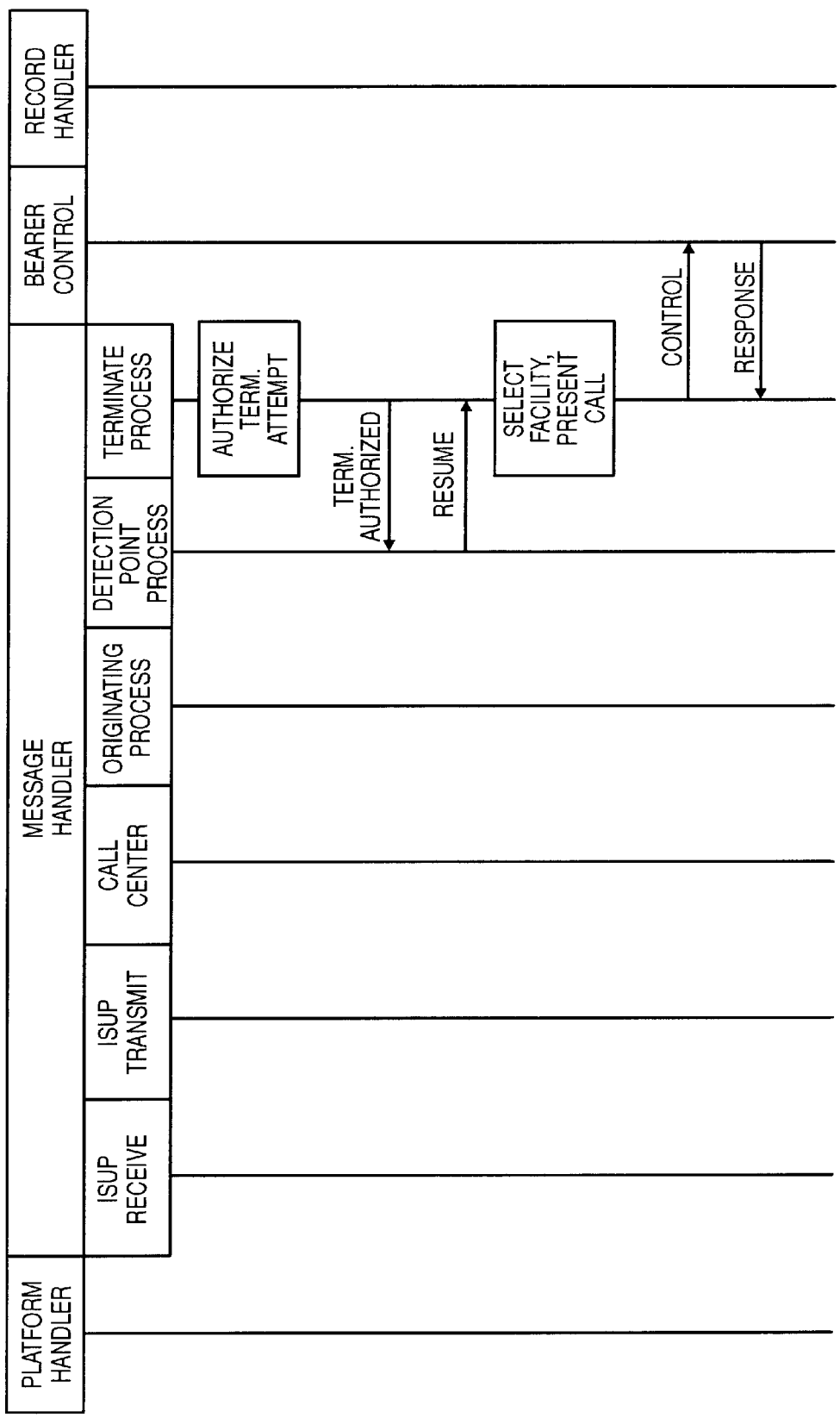
FIG. 8 is a message sequence chart for a version of the invention.
Figure 9:
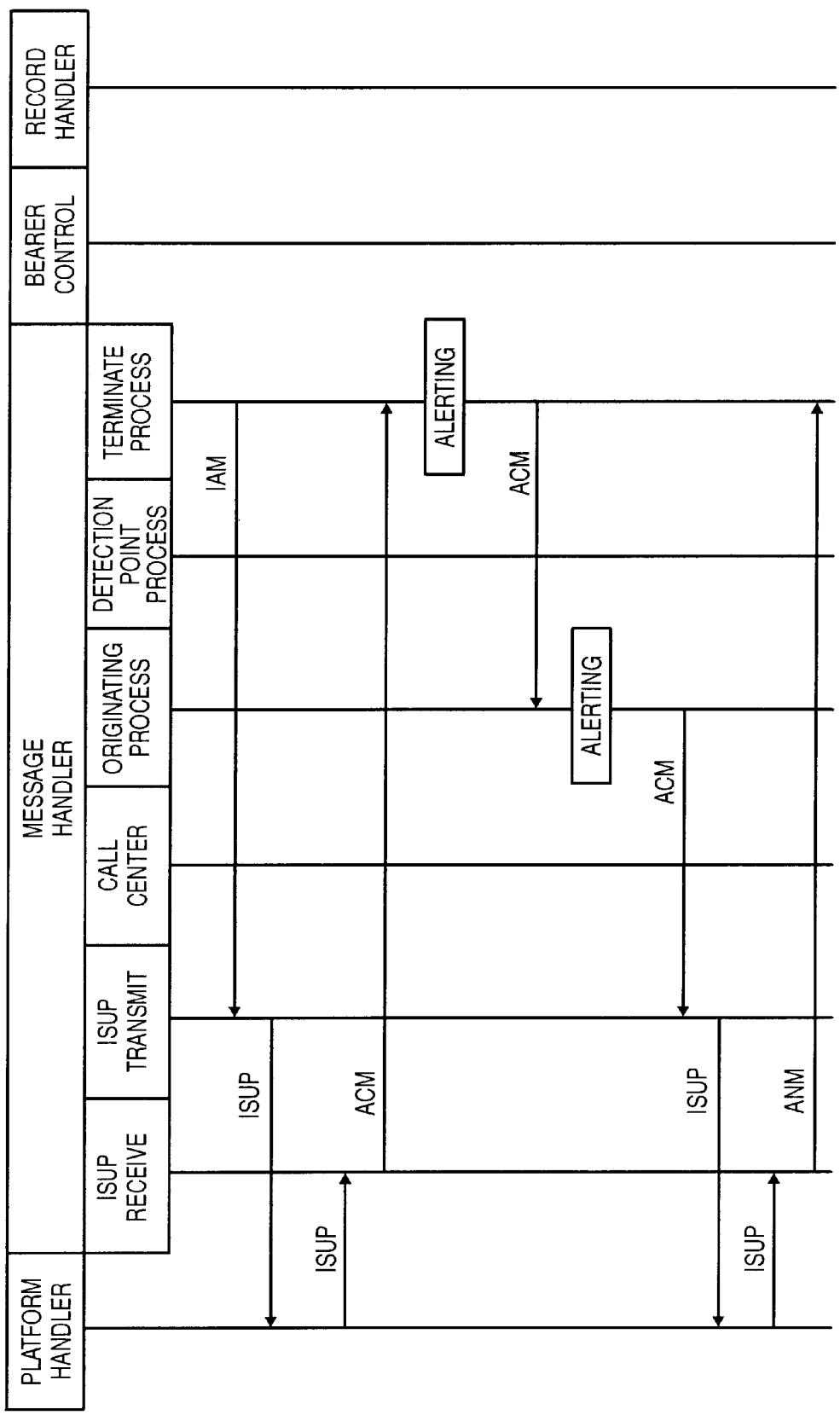
FIG. 9 is a message sequence chart for a version of the invention.
Figure 10:
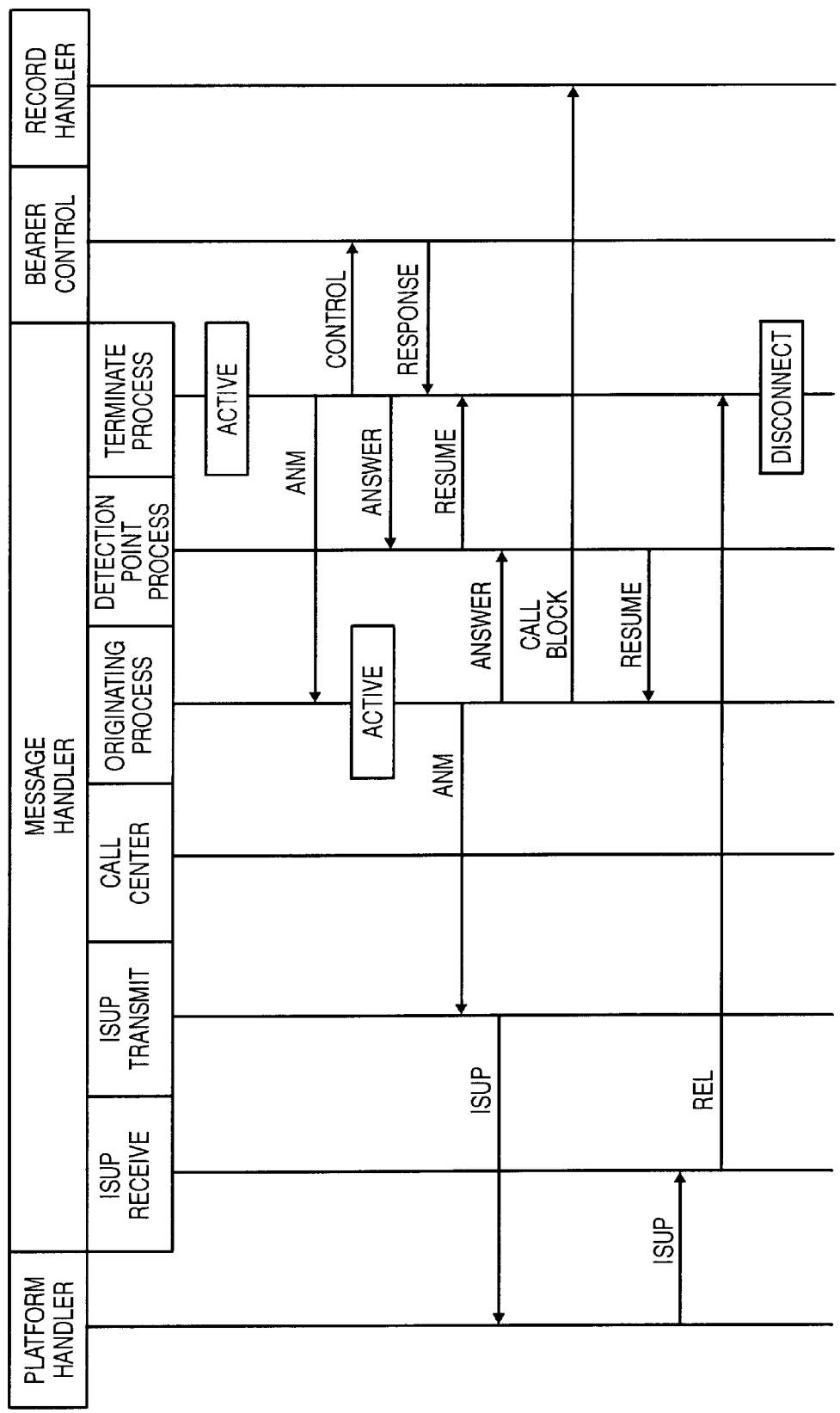
FIG. 10 is a message sequence chart for a version of the invention.
Figure 11:
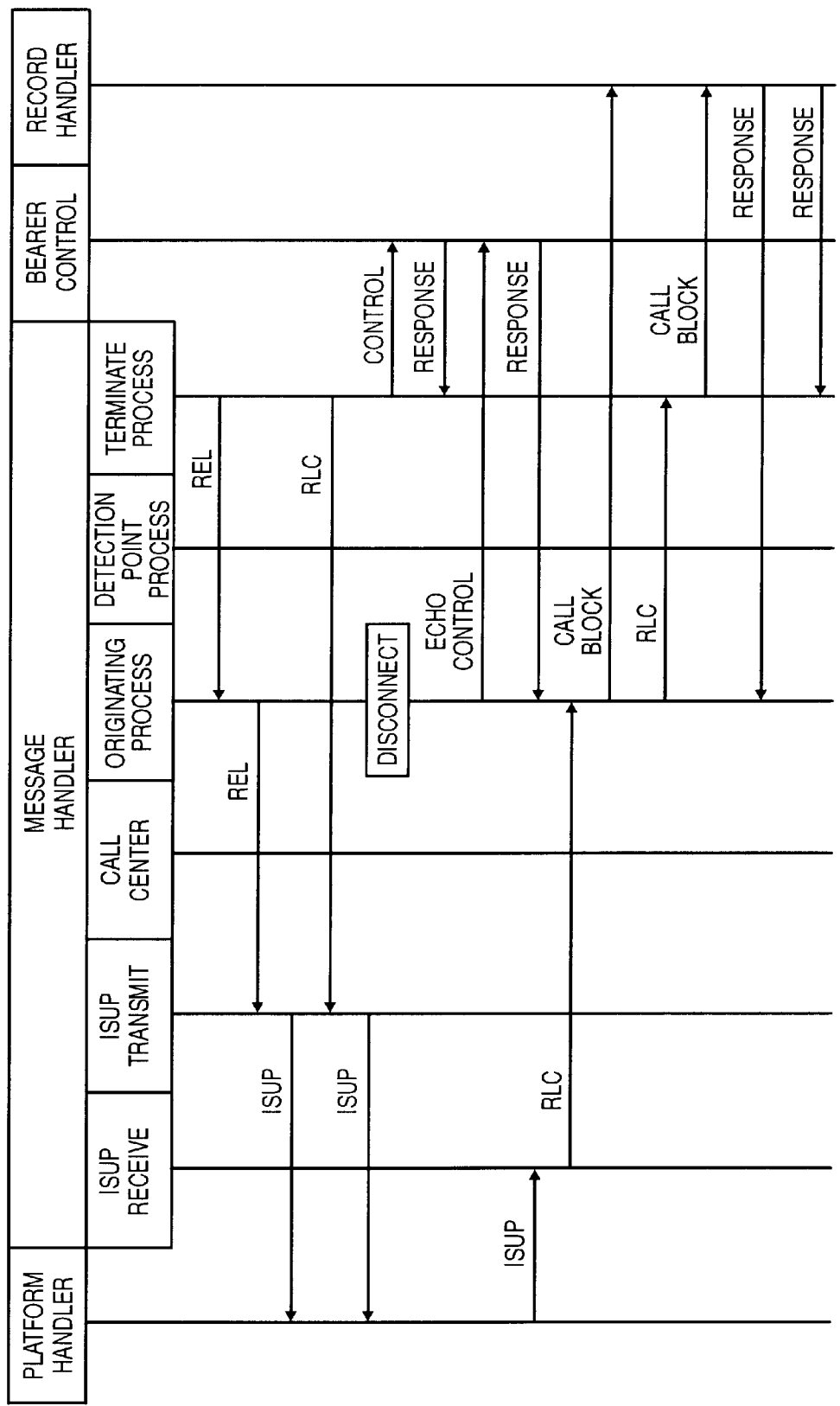
FIG. 11 is a message sequence chart for a version of the invention.
Figure 12:
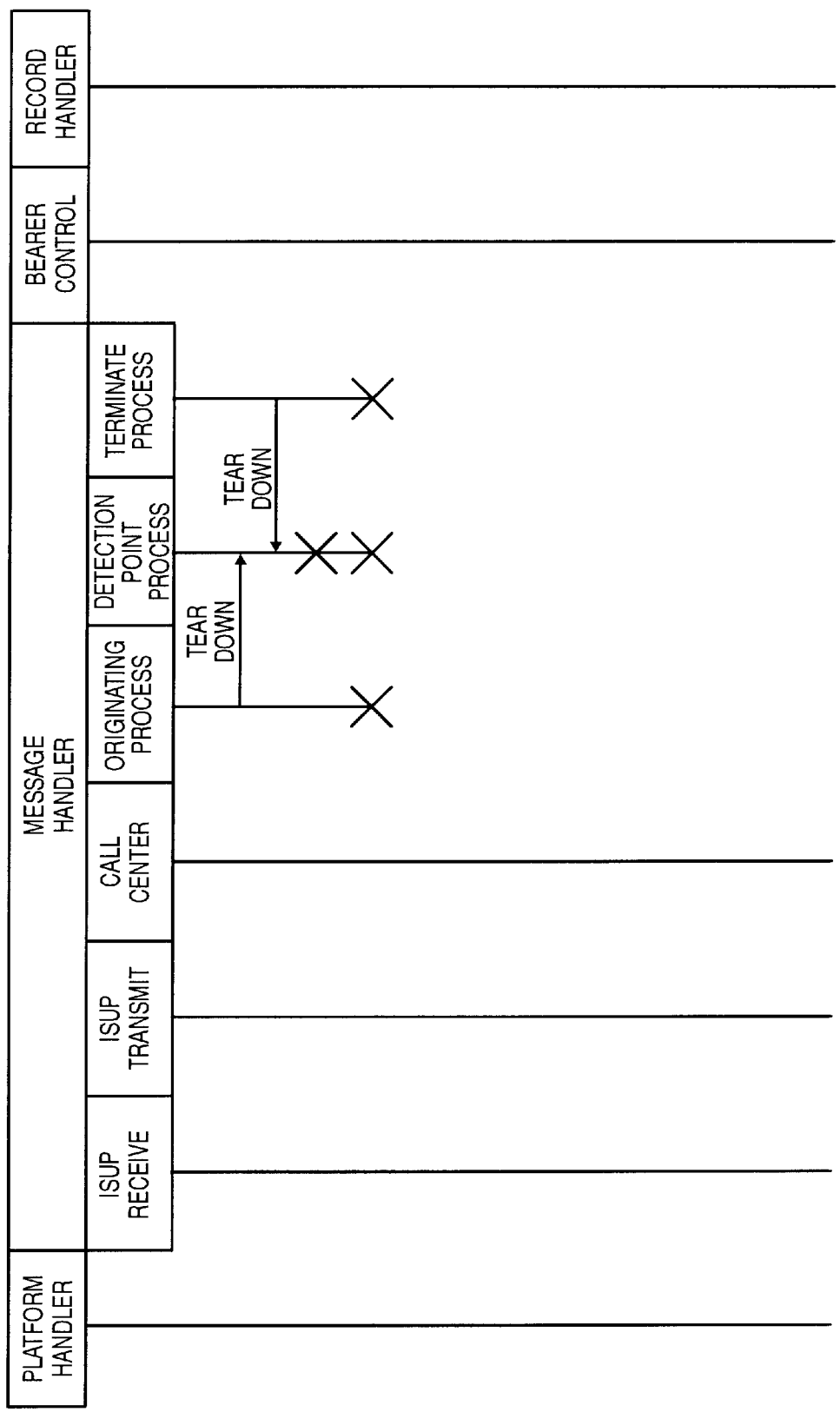
FIG. 12 is a message sequence chart for a version of the invention.

Continuing on to FIG. 8, the terminating process executes through the "authorize termination attempt" point-in-call. This typically entails verifying that an ATM connection to another gateway can be attempted. For example, the CCM and the gateway at the terminating end must be operational to handle the call. Once termination is authorized, an authorized message is sent to the detection point process, which returns a resume message to the termination manager (unless a detection point is programmed into the detection point process.)

The terminating process will then execute through the "select facility and present call" point-in-call. This typically entails selecting the actual VPI/VCI and outbound connection for the call. The destination has already been specified during the "routing" point-in-call, so the VPI/VCI and point codes can be looked-up accordingly. The terminating process will then send a message to bearer control requesting gateway control. Bearer control would then create a message for the originating gateway identifying the connections and devices relevant to the call. Bearer control would respond that gateway control was handled. Continuing on to FIG. 9, the terminating process would then construct an IAM for transmission to the downstream CCM at the terminating gateway. As discussed above, this message could be coded such that the downstream CCM could skip detailed call processing. The IAM would be provided to the ISUP sender and a formatted IAM would be provided to the platform handler for subsequent transmission to the downstream CCM.

On a typical call, the next message that would be received by the CCM that is related to the call would be an Address Complete Message (ACM) signifying that the terminating end of the call had the information required to complete the call. The external device would send an ACM back to the terminating CCM which would pass on an ACM to the originating CCM. These procedures at the terminating CCM are not depicted in the message sequence chart. The message sequence chart continues with the ACM arriving at the originating CCM.

The ISUP receive process would forward the ACM to the terminating process. The terminating process would execute through the "alerting" point-in-call and would send ACM information to the originating process, which would also execute through the "alerting" point-in-call. Alerting entails alerting the users that a connection is available—i.e. ringing a telephone. Typically, no specific activity is required for "alerting", but detection points could be inserted into the process if desired. The originating process would forward an ACM to the ISUP sender which would provide a formatted ACM to the platform handler for subsequent transmission to devices at the origination side of the call.

On the typical call, an Answer Message (ANM) will be transferred from the terminating side of the call to the origination side of the call when the called party answers the phone. The ANM is received by the platform handler and forwarded to the ISUP receive process which forwards its version to the terminating process. Continuing on to FIG. 10, the terminating process executes though the "active" point-in-call and sends ANM information to the detection point process. Typically, the detection point process will return a resume message, although detection points could be included here if desired. The terminating process also sends a gateway control message to bearer control to facilitate cut-through on the call at the gateway. A acknowledgment response is sent back to the terminating process from bearer control. The terminating process also sends ANM information to the originating manager, which also executes through the "active" point-in-call. The originating process also sends an answer message to the detection point process and a partial call control block to the record handler. Typically, the detection point process will send a resume message back to the origination process. The originating process would forward an ANM to the ISUP sender which would provide a formatted ANM to the platform handler for subsequent transmission to devices at the origination side of the call. At this point, the call is in progress.

The message sequence continues with the receipt of a release message (REL) after the caller or called party hang up. As stated above, if the called party hangs up, a suspend message (SUS) is sent before the call is released, but if the caller hangs up, only an REL is sent. For clarity, the chart picks up with an REL arriving from the terminating side of the call. The REL is received by the platform handler and transferred to the ISUP receive process, which provides its version of the message to the terminating process. (Had the REL been from the originating side, it would have been provided to the originating process.) The terminating process executes through the "disconnect" point-in-call. Continuing on FIG. 11, the terminating process sends REL information to the originating process. The originating process would forward an REL to the ISUP sender which would provide a formatted REL to the platform handler for subsequent transmission to devices at the origination side of the call. In response to the REL, the terminating process will forward a Release Complete Message (RLC) to the ISUP sender which would provide a formatted RLC to the platform handler for subsequent transmission to the device that sent the REL. The RLC acknowledges the REL and signifies that the call connections may be torn down and re-used. The terminating process also sends a gateway control message to bearer control to cause the relevant VPI/VCI to be torn down, and receives an acknowledgment response from bearer control.

The next message will typically be an RLC in response to the REL sent to the originating side of the call. The RLC is received by the platform handler and forwarded to the ISUP receive process. ISUP receive provides its version of the message to the originating process. This causes the originating process to forward its final call control block to the record handler. The originating process also provides RLC information to the terminating process. This causes the terminating process to send its final call control block to the record handler. The record handler responds to each process with an acknowledgment response. Continuing on to FIG. 12, tear down messages are sent by the originating process and the terminating process to their respective detection point processes. Typically, no detection points will be programmed and the originating process, the terminating process, and the detection point processes will terminate and be cleared from the CCM.

Figure 13:
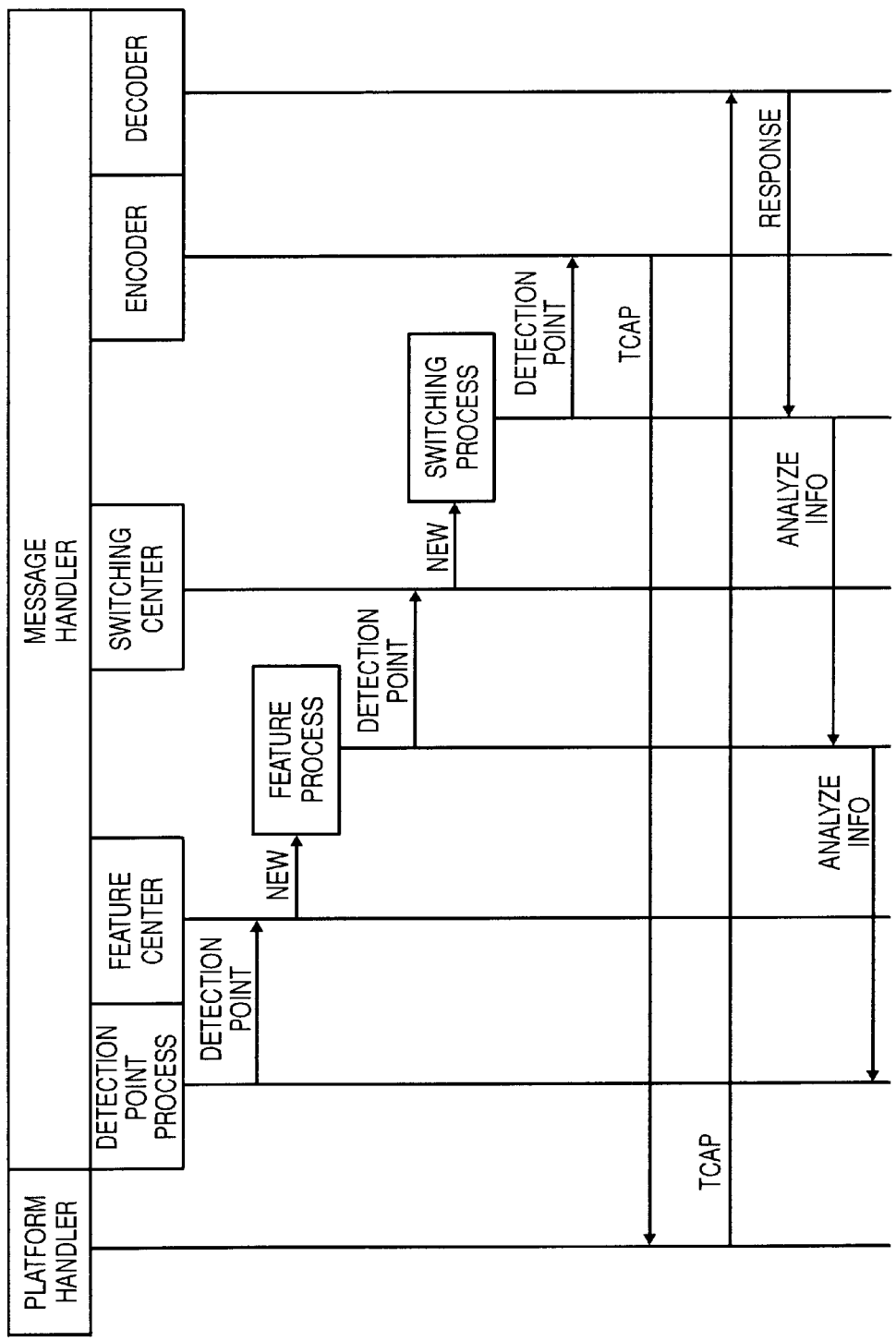
FIG. 13 is a message sequence chart for a version of the invention.

FIG. 13 also depicts a modified excerpt from the message sequence charts above. The modification is for a call that requires services. Services might include N00 or VPN calls, but many other services are known. In this embodiment, an SCP is accessed to provide information to implement the service. As shown, call processing picks up where the detection point process for either the originating process or the terminating process analyzes a detection point and determines that a service is required.

Typically, this is done by examining the dialed number and the caller's number. Those skilled in the art are aware of how services can be determined from call information.

If it is determined that a service should be applied to the call, the detection point process sends detection point message to the feature center that causes the feature center to create an feature process. The feature process will be perameterized with call information and will send a detection point message to the switching center. In some embodiments, the feature process will choose between "IN" services and "non-IN" services and send the detection point message to the corresponding switching center. Upon receiving the message, the switching center creates a service process for each service to be applied to call. The service process formulates a request for service information and forwards it to the encoder of the SCF access manager. The encoder produces a TCAP message and transmits it over the appropriate link to a remote SCF. (possibly through the platform handler and/or the MTP interface). The remote SCF will return a response to the decoder. The response is formatted for the service process and sent to it. The service process takes the response and formulates an analyze information message that is transferred back through the feature process to the detection point process. The detection point process transfers the analyze information message to the applicable originating or terminating process. Subsequent call processing remains the same as discussed above. At call tear down, the feature process and the switching process are cleared from the CCM.

An example of the above scenario would be for an "800" call. The CCM would recognize that the "800" in the called number required service application. As a result, it would generate and transmit TCAP query to an SCP requesting an "800" translation. The SCP would process the query and translate the "800" number into a POTS number. The SCP would return the POTS number to the requesting CCM. The CCM would then process the POTS number as it would for a standard POTS call.

In some embodiments, the CCM processes SS7 signaling messages to accomplish the following functions: validation, routing, and billing. SS7 messages are well known in the art. The following sections discuss SS7 processing, but those skilled in the art will recognize variations that are also contemplated by the invention. In SS7, the routing labels of the messages are used to correlate messages to calls. Contemporaneous messages with the same OPC, DPC, and CIC relate to the same call.

To validate a call, the routing label of messages should be checked. The Service Indicator should be checked to distinguish between an incoming message from outside of the network or a message from a network CCM. The Destination Point Code is screened to ensure the destination of the SS7 message is actually destined for the CCM. The Originating Point Code is screened to ensure the originating point code is allowed in the CCM. The Message Type is screened to ensure that the type of message is allowed in the CCM and that there are no protocol violations associated with the message.

Both the Circuit Reservation Message (CRM) and the IAM should have the Satellite Indicator screened to ensure that the limit on the number of Satellites in a circuit has not been exceeded. This will be on a trunk group by trunk group basis. The REL automatic congestion level will be screened to see if congestion arises. The CCM should then control calls to the associated network elements until the congestion abates. For non-call associated messages, the circuit group supervision message type indicator will be screened to compare the state of the circuits with the instructions incoming in the messages.

The IAM will receive additional treatment for validation. Information Transfer Capability will be screened to ensure that the connection for the call is capable of handling the transfer rate requested. The Coding Standard will be screened to ensure that the standard is coded 00. All others will be rejected. Transfer Mode will be screened to ensure that the mode is coded 00 for 64 Kbit/second calls. User Layer Protocol ID and the Rate field will be screened to ensure that there is no rate adaptation required for the call. The Network ID Plans and Digits, will be screened to ensure that the carrier identification field and the transit network carrier identification field is in the correct format. The Circuit Code will be screened to allow callers with the correct means of dialing to access the network.

The CCM will check the Hop Counter in the IAM to determine if it has reached its limit as set by this field (range 10 to 20 with a default of 20). If it has not, the CCM will increment the parameter. If it has reached the determined count, the CCM will send a release message back with a cause of "exchange routing error" to tell the preceding switch that the IAM has reached its limit in hops. If this field is left blank, the CCM will not increment the counter parameter and pass the IAM unchanged.

The IAM Called Party Number field should be handled as follows for validation. Nature of Address will tell the CCM what type of number was dialed for the called number. The screening of this field will be for a non-NPA number. If that occurs, the CCM will need to add the NPA from the Trunk Group to the call control block. Numbering Plan will be screened to check what type of plan the incoming called party number uses. The only allowable plans are Unknown and ISDN numbering plans. All others should be disallowed. Digits Field will be screened for the number of digits using the Nature of Number, Odd/Even, and Digits Fields to determine the correct number of digits.

The IAM Calling Party Number and Charge Number fields should be handled as follows for validation. Nature of Address will be screened to ensure that the calling party's number is in the proper format. Presentation Allowed/Restricted will be screened to check for N00 calling. Numbering Plan will be checked to ensure that the numbering plan is set at either unknown or ISDN numbering plan. Digits Field will be checked to ensure that there is enough digits for an ANI that can be billed. These digits will be validated in an ANI table for call authorization.

Routing is primarily accomplished by processing the IAM. Called Party Number—Nature of Address, Digits— This will tell the CCM what type of call this is. It will differentiate 0+, test calls, and International numbers from normal 1+ calls. The Calling Party's Category tells the CCM that the call is a test call with different routing than a normal call. The Carrier Identification Plan will be used to determine if the CCM receives the Carrier Identification Code of another carrier, since the CCM may wish to route the call based on the subscribers choice of carriers. The IAM Carrier Selection Information is used to route the call based on whether the subscriber was presubscribed or dialed the carrier access number. The IAM Originating Line Information will enable the CCM to route based on what type of originating line is being used for this call. An example is if a payphone makes a 1+ call, the CCM will be able to route the call directly to an operator for billing arrangements. The IAM Transit Network Selection fields will indicate the Carrier Identification Code of the International Carrier that is requested by the subscriber, so the CCM can route the international call to the correct switch. The Circuit Code will tell the CCM how the code was dialed. If the subscriber dialed an access code for a different international carrier, the CCM could route the call to an operator center for processing.

The IAM Called Party Number fields are handled as follows for routing. Nature of Address Indicator tells what type of call is being requested. This will include 0+ and 0− calls, international calls (operator and non operator calls), cut through, and 950 types of calls. With this information, the CCM can route the call directly to the international gateway or operator center without looking at the rest of the message. For normal 1+ calls, the Odd/Even field will be used with the digits fields to determine the number of digits. Numbering Plan field will be used to route calls differently if it has a "Private Numbering Plan" value in the field. Digits Field will be the digits that will be used to route the call through the network using table look-ups. Typically, the digits field houses the dialed number.

Billing will be based on the Call Control Blocks (CCBs) created by the call processes. A portion of these records are transferred from messages received by the CCM. The CCBs are discussed above. When the Calling Party Number is present in the IAM and there is no Charge Number present, the Calling Party Number is used to bill the call. If the Charge Number is present in the same message, then the Charge Number will be used for billing instead of the Calling Party Number. Various messages need to be tracked to measure the duration of the call. These include the IAM, ACM, ANM, SUS, REL, and RLC. The causes associated with these messages should also be considered.

The invention allows switching over an ATM fabric on a call by call basis. This allows efficient high capacity virtual connections to be exploited. Advantageously, the invention does not require signaling capability in an ATM switch. The invention does not require call processing capability in an ATM switch. This enables networks to implement ATM switching without these sophisticated ATM switches that support high volumes of calls. It also avoids the cost of these switches. Relying on ATM cross-connects is advantageous because ATM cross-connects are farther advanced than ATM switches, and the cross-connects require less administrative support.

Those skilled in the art will appreciate variations of the above described embodiment. In some embodiments, other signaling, such as C7 or UNI signaling could be used instead of SS7. Other embodiments might make use of network management techniques to control gateway 200. An example would be the use of a Telecommunications Management Network (TMN) to control the gateway in situations where slowly changing VPI/VCI mappings are needed. Those skilled in the art will also appreciate that a gateway could be implemented within a single network at points where dynamic VPI/VCI conversion is desirable. Gateways between multiple successive networks could also be employed. In addition to these embodiments, other variations will be appreciated by those skilled in the art. As such, the scope of the invention is not limited to the specified embodiments, but is only restricted to the following claims.

We claim:

1. A method of handling a telecommunications call, the method comprising:

receiving an initial address message for the call in a call processor;

receiving asynchronous communications for the call in a gateway wherein the asynchronous communications for the call include a first virtual identifier for routing the asynchronous communications;

in the call processor, processing the initial address message to select a second virtual identifier for routing the asynchronous communications;

transferring an instruction indicating the second virtual identifier from the call processor to the gateway;

in the gateway, modifying the first virtual identifier in the asynchronous communications to the second virtual identifier; and transferring the asynchronous communications including the second virtual identifier from the gateway, wherein the call processor and the gateway are external to any asynchronous transfer mode switches, and wherein the gateway has a single input port for receiving the asynchronous communications and a single output port for transferring the asynchronous communications.

2. The method of claim 1 wherein receiving the initial address message for the call comprises receiving Signaling System #7 signaling.

3. The method of claim 1 wherein processing the initial address message comprises processing a dialed number.

4. The method of claim 1 wherein processing the initial address message comprises accessing a Service Control Point.

5. The method of claim 1 further comprising:
receiving a release message for the call in the call processor
in response to the release message, transferring another instruction indicating the second virtual identifier from the call processor to the gateway; and
in the gateway, disassociating the first virtual identifier and the second virtual identifier in response to the other instruction.

6. The method of claim 5 further comprising receiving and processing an address complete message for the call in the call processor.

7. The method of claim 6 further comprising receiving and processing an answer message for the call in the call processor.

8. The method of claim 7 further comprising receiving and processing a release complete message for the call in the call processor.

9. The method of claim 1 further comprising generating billing information for the call in the call processor.

10. The method of claim 1 further comprising validating a caller in the call processor.

11. The method of claim 1 wherein the call processor and the gateway are located in a second network and further comprising:
receiving and processing the call in a first network to generate the initial address message for the call and to select the first virtual identifier for routing the asynchronous communications;
transferring the initial address message from the first network to the second network; and
transferring the asynchronous communications for the call from the first network to the gateway in the second network using the first virtual identifier for routing the asynchronous communications.

12. A telecommunications system for handling a call, the telecommunications system comprising:
a call processor configured to receive an initial address message for the call, process the initial address message to select a second virtual identifier for routing asynchronous communications, and transfer an instruction indicating the second virtual identifier; and
a gateway coupled to the call processor and configured to receive the instruction, to receive asynchronous communications for the call that include a first virtual identifier for routing the asynchronous communications, modify the first virtual identifier in the asynchronous communications to the second virtual identifier in response to the instruction, and transfer the asynchronous communications including the second virtual identifier, wherein the call processor and the gateway are external to any asynchronous transfer mode switches, and wherein the gateway has a single input port for receiving the asynchronous communications and a single output port for transferring the asynchronous communications.

13. The telecommunications system of claim 12 wherein the initial address message for the call comprises Signaling System #7 signaling.

14. The telecommunications system of claim 12 wherein the call processor is configured to process a dialed number from the initial address message.

15. The telecommunications system of claim 12 wherein the call processor is configured to access a Service Control Point.

16. The telecommunications system of claim 12 wherein:
the call processor is configured to receive a release message for the call, and in response to the release message, transfer another instruction indicating the second virtual identifier to the gateway; and
the gateway is configured to disassociate the first virtual identifier and the second virtual identifier in response to the other instruction.

17. The telecommunications system of claim 16 wherein the call processor is configured to receive and process an address complete message for the call.

18. The telecommunications system of claim 17 wherein the call processor is configured to receive and process an answer message for the call.

19. The telecommunications system of claim 18 wherein the call processor is configured to receive and process a release complete message for the call.

20. The telecommunications system of claim 12 wherein the call processor is configured to generate billing information for the call.

21. The telecommunications system of claim 12 wherein the call processor is configured to validate a caller.

22. The telecommunications system of claim 12 wherein the call processor and the gateway are located in a second network, and further comprising a first network configured to receive and process the call to generate the initial address message for the call and select the first virtual identifier for routing the asynchronous communications, to transfer the initial address message to the second network, and to transfer the asynchronous communications for the call to the gateway in the second network using the first virtual identifier for routing the asynchronous communications.

* * * * *